Patented Dec. 30, 1941

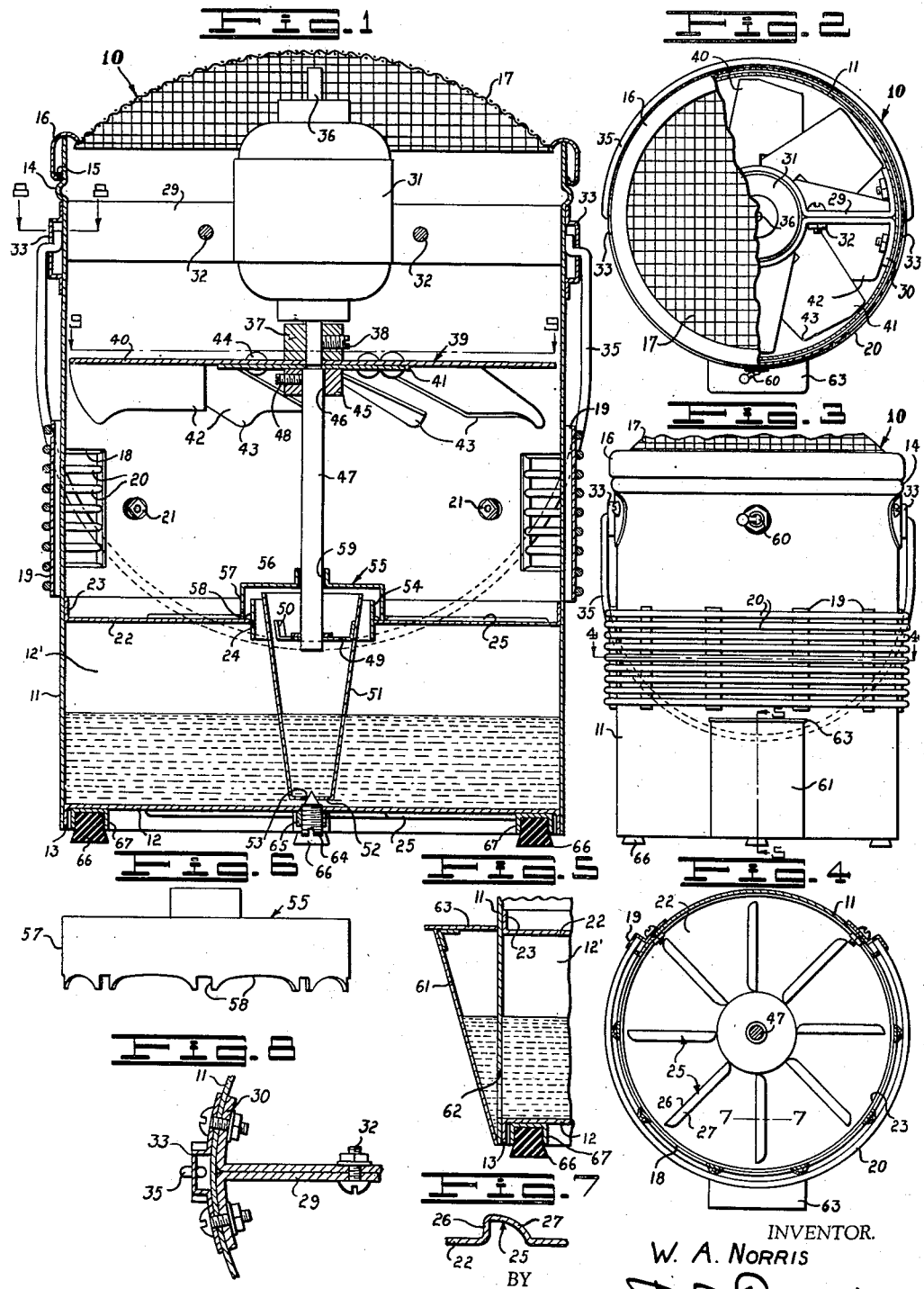

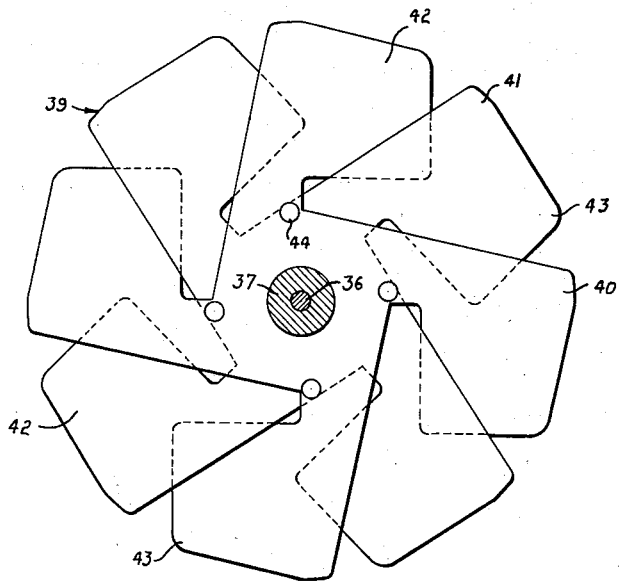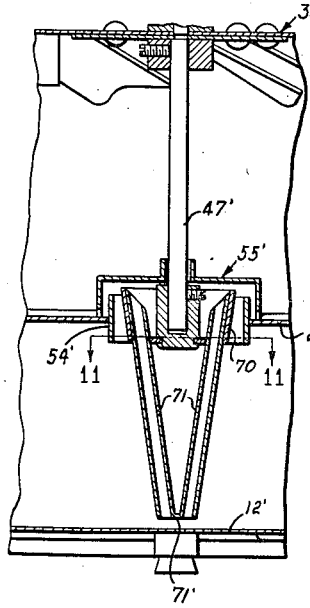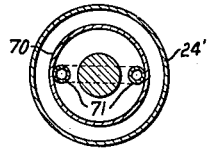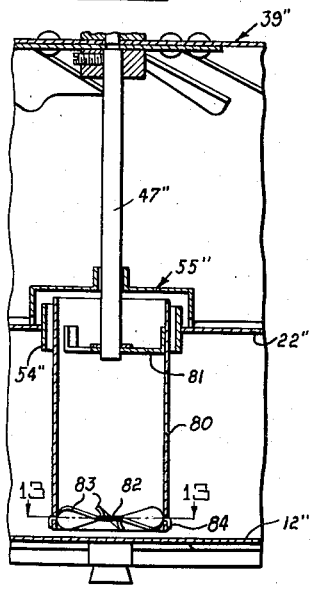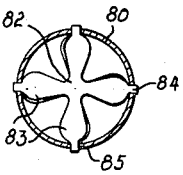

2,267,835

UNITED STATES PATENT OFFICE 2,267,835

AIR CONDITIONER

William A. Norris, Alhambra, Calif., assignor to William H. Fabry and Rae H. Fabry, both of Alhambra, Calif., as joint tenants Application August 6, 1940, Serial No. 351,605

4 Claims. (Cl. 261—30)

This invention relates to air conditioners.

The general object of the invention is to provide an improved evaporative cooler which is particularly adapted for use as a portable unit in homes and in offices.

A more specific object of the invention is to provide an evaporative cooler including a receptacle and a container arranged above the receptacle with novel means for transferring water from the receptacle to the container.

Another object of the invention is to provide a novel evaporative cooler including a novel water container wherein means is provided for causing agitation of the surface of the water in the container.

Another object of the invention is to provide an evaporative cooler including vertical, superimposed, receptacle, container, fan and motor whereby a compact unit is provided.

Another object of the invention is to provide an evaporative cooler including a novel fan member.

A further object of the invention is to provide an evaporative cooler including a novel pump member.

An additional object of the invention is to provide an evaporative cooler including a novel housing for an evaporative cooler.

Other objects and the advantages of this invention will be apparent from the following description taken in connection with the accompanying drawings, wherein:

Fig. 1 is a central sectional view through an evaporative cooler embodying the features of my invention;

Fig. 2 is a top plan view of the cooler on a reduced scale with parts broken away;

Fig. 3 is a side elevation on a reduced scale;

Fig. 4 is a section taken on line 4—4, Fig. 3;

Fig. 5 is a section taken on line 5—5, Fig. 3;

Fig. 6 is a fragmentary side elevation showing the spray shield;

Fig. 7 is a section taken on line 7—7, Fig. 4;

Fig. 8 is a fragmentary sectional view taken on line 8—8, Fig. 1; and

Fig. 9 is a sectional view taken on line 9—9, Fig. 1.

Referring to the drawings by reference characters I have shown my invention as embodied in an evaporative cooler which is indicated generally at 10. As shown the cooler includes a housing 11 having a bottom 12 therein to thereby form a receptacle 12'. The bottom 12 is provided with a down turned flange 13 which may be suitably welded or otherwise secured in place.

The top of the housing 11 includes an outwardly directed bead 14 which is engaged by a down turned flange 15 on an annular ring 16. The ring 16 has the edge of a dome shaped reticulated mesh member 17 secured thereto as by soldering and the flange 15 is removable to allow access to the interior of the housing.

The housing intermediate its length includes a slot 18 which extends more than half way around the housing to provide an outlet for the conditioned air. Extending across the slot 18 I show a grill which includes transverse members 19 and arcuate members 20 which are secured as by welding to the transverse members. At each end the transverse member is secured to the housing as by a screw 21 so that the grill may be removed for cleaning or other purposes.

Spaced above the bottom 12 I show a transverse partition 22 which has an upwardly extending peripheral flange 23 thereon and which is provided with a central aperture 24. The partition 22 includes upwardly extending beads or corrugations 25 best shown in Fig. 7, wherein it will be noted that one face as at 26 of the corrugation is abrupt while the other face 27 is gradual so that as the circulation of water, which is toward the face 26, strikes this face riffles will be produced and agitation of the water secured. The partition 22 forms a container for water pumped from the receptacle 12'.

The bottom 12 is shown as provided with the corrugations 25 so that the bottom 12 and partition 22 may be made in the same die but there is no function in the corrugations shown in the bottom 12.

The housing includes a transversely extending bracket 29 which has flanged ends 30 secured to the housing and has inwardly directed portions which surround a motor 31 and are clamped against the motor by bolts 32. The flanges 30 on the end of the brackets are in line with securing members 33 so that the same fastening means serves to secure the members 29 and 33 in place. The members 33 have apertures 34 receiving a bail 35 by means of which the cooler may be moved from place to place.

The motor 31 includes an armature shaft 36 on which a collar 37 is secured by a set screw 38. The collar 37 is engaged by a fan member 39 which includes a pair of superimposed fan members 40 and 41. Each of the fan members includes a central hub portion having a plurality of outwardly directed vane members thereon. The vane members have their trailing edge arranged in quadrilateral form and their leading edge includes downwardly directed tongues 42 each of which extends beneath the preceding vane member.

The vane members are rounded at the lower edge 43 and are bent inwardly as shown. The fan members 40 and 41 are secured together as by rivets 44 and may be secured to the collar 37 as by welding. A second collar 45, coaxial with the collar 37, is shown as secured as by welding to the lower fan member and includes an aperture 46 receiving a shaft 47 which is held in place by a set screw 48.

At its lower end the shaft 47 extends through the aperture 24 in the partition 22 and terminates in a spider 49 secured thereto as by welding. The arms of the spider include terminal tabs 50 which are soldered or otherwise fastened to the interior of a cone member 51.

The cone member 51 is in the form of a hollow truncated cone coaxial with the shaft 47 and having the smaller end downward. The cone member 51 terminates downwardly a short distance from the bottom 12 of the housing 11 and includes a bottom 52 having a central aperture 53 therein. The cone member 51 is open at the top and terminates at its top a short distance above an annular flange member 54 which I provide surrounding the aperture 24 and extending both upwardly and downwardly from the partition 24.

Surrounding the flange 54 and spaced therefrom I provide a spray shield 55 which includes a disk 56 and a depending rim 57 having notches 58 therein which may be of the shape shown in Fig. 6. The disk 56 includes a central aperture 59 to accommodate the shaft 47. The spray shield 55 is preferably not fastened to either the shaft 47 or to the partition 22 but merely rests upon the latter.

To control the circuit to the motor 32 I provide a switch 60 of standard type which may be secured to the housing 11 as shown in Figs. 2 and 3.

When the device 10 is used as a fan to merely circulate the air in a room, the switch 60 is operated and the motor 31 drives the fan member 39 which draws air through the mesh member 17 and discharges it through the slot 18.

When the device 10 is used as an evaporative cooler, the space within the housing 11 above the bottom 12 is filled with water as shown in Fig. 1. In order to introduce the water I provide a wedge shaped filling spout 61 as shown in Fig. 5. The spout 61 communicates with the interior of the housing 11 through an aperture 62 therein. To close the spout 61 I provide a removable cover 63 therefor.

It will be seen that water enters the interior of the cone 51 through the aperture 53 and upon rotation of the cone the water will be raised therein by centrifugal action. The water is discharged at the top of the cone and is thrown against the spray shield 55 and distributed onto the partition 22. When the water level is sufficiently high above the partition, any excess water is returned to the main body by spilling over the flange 54.

As air is directed by the fan upon the surface of the water on the partition, water is evaporated and the air thereby cooled. The air striking the surface of the water will produce circulation and agitation therein, which effect will be enhanced by the corrugations 25 as previously described.

In order to control the flow of water into the cone 51 I may provide a needle valve 64 mounted in a threaded bushing 65 centrally secured to the bottom 11 adjacent the aperture 53 in the bottom of the cone as shown in Fig. 1. It will be seen that by moving the needle valve 14 to or from the aperture 53 the flow of water may be retarded or increased.

To prevent the marring of surfaces on which the device 10 may be placed and to reduce vibration, I may provide a plurality of rubber cushion members 66 which are engaged by socket members 67 secured to the bottom 12.

From the foregoing description it will be apparent that I have invented a novel evaporative cooler that is economical to manufacture, attractive in appearance, and highly efficient for its intended purpose.

Having thus described my invention I claim:

1. In an evaporative cooler, a housing having a closed bottom and an inlet and having an intermediate partition having an aperture therein, a motor mounted within said housing and having a depending shaft extending through the aperture in said partition, a truncated cone mounted on said shaft, the larger end of said cone being upward, the lower end of said cone being apertured, a raised rim around the central aperture in said portion, a shield member disposed around said rim and comprising a cylindrical portion secured to said partition and spaced from said rim and including a top having an aperture through which said shaft passes, said cone extending beyond said rim into said shield member and being adapted to raise water from said bottom to a location above said partition, said housing having an outlet above said partition, and a fan on said shaft and adapted to direct a column of air upon water above said partition.

2. In an evaporative cooler, a housing having a closed bottom and a reticulated mesh top and having an intermediate partition having an aperture therein, said partition having corrugations therein, a motor mounted within said housing and having a depending shaft extending through the aperture in said partition, a spider on the lower end of said shaft, a truncated cone coaxial with said shaft, the larger end of said cone being upward and engaging said spider, the lower end of said cone being apertured, a raised rim around the central aperture in said portion, a shield member disposed around said rim and comprising a cylindrical portion secured to said partition and spaced from said rim and including a top having an aperture through which said shaft passes, said cylindrical portion being notched adjacent said partition, said cone extending beyond said rim into said shield member and being adapted to raise water from said bottom to a location above said partition, said housing having an outlet above said partition, and a fan disposed below said motor on said shaft and adapted to direct a column of air upon water above said partition.

3. In an evaporative cooler, a cylindrical housing having a closed bottom and a domed reticulated mesh top and having an intermediate partition having a central aperture therein, said partition having radial corrugations therein, a motor mounted within the upper portion of said housing and having a depending shaft extending through the aperture in said partition, a spider on the lower end of said shaft, a truncated cone coaxial with said shaft, the larger end of said cone being upward and engaging said spider, the lower end of said cone being apertured, a raised rim around the central aperture in said portion, a shield member disposed around said rim and comprising a cylindrical portion secured to said partition and spaced from said rim and including a top having an aperture through which said shaft passes, said cylindrical portion being notched adjacent said partition, said cone extending beyond said rim into said shield member and adapted to raise water from said bottom to a location above said partition, said housing having an outlet above said partition, a grill over said outlet, a fan disposed below said motor on said shaft and being adapted to direct a column of air upon water above said partition, said fan comprising a pair of superimposed plates having extending arms thereon, the arms of one plate being alternate with respect to the arms of the outer plate, each of said arms including a downwardly extending quadrilateral blade, a needle valve in said bottom of said housing adjacent the apertured bottom of said cone for controlling the flow of water thereto.

4. In an evaporative cooler, a cylindrical housing having a closed bottom and a reticulated mesh top and having an intermediate partition, said partition having a central aperture, said housing having a circumferentially extending outlet slot above said partition, a circumferentially extending grill aligned with said slot, a cylindrically extending spray shield surrounding said aperture and spaced therefrom, a bracket extending across said housing, a motor mounted on said bracket and disposed in the upper portion of said housing, said motor having a depending armature shaft arranged coaxial with the aperture in said partition, means to introduce water into said housing above said bottom, means on the lower end of said shaft to raise water above said partition, a fan on said shaft above said partition, said fan including radial blades adapted to impinge a stream of air upon the water above said partition.

WILLIAM A. NORRIS.